L. Wright,
Scroll Sawing Machine,
No 2,203, Re-Issued March 13, 1866.
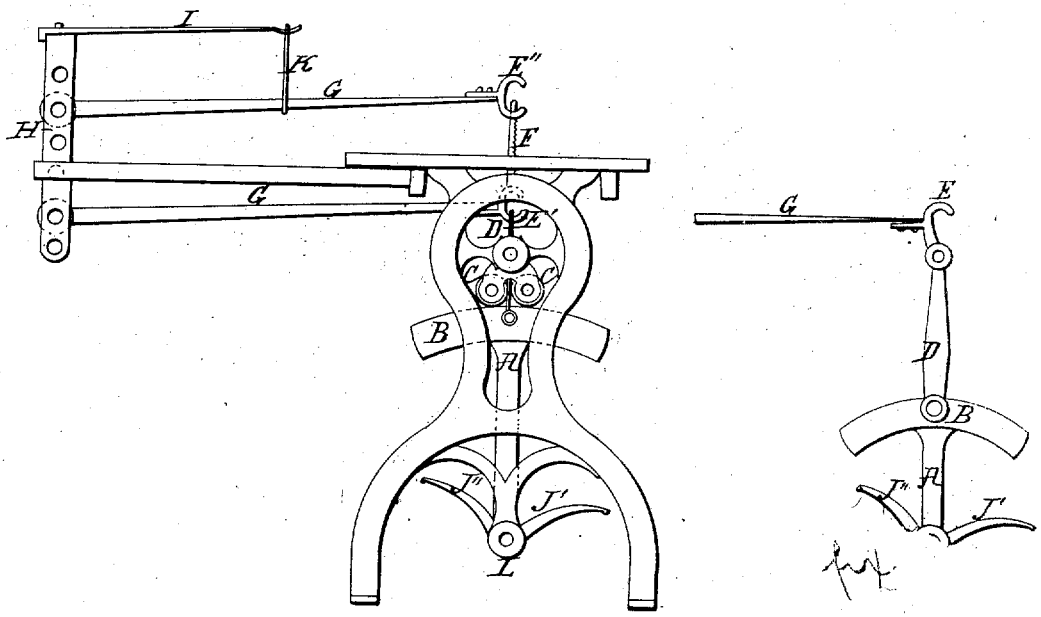
Witnesses:
Benjamin F Taylor
L H Ulmstead
Inventor
Lysander Wright

UNITED STATES PATENT OFFICE.

LYSANDER WRIGHT, OF NEWARK, NEW JERSEY, ASSIGNOR TO HIMSELF AND CHARLES B. SMITH.

IMPROVEMENT IN SCROLL-SAWING MACHINES.

Specification forming part of Letters Patent No. 47,777, dated May 16, 1865; Reissue No. 2,203, dated March 13, 1866.

*To all whom it may concern:*

Be it known that I, LYSANDER WRIGHT, of the city of Newark, in the county of Essex and State of New Jersey, have invented a new and Improved Method of Operating Scroll-Saws; and I do hereby declare that the following is a full and exact description thereof, reference being had to the accompanying drawings, and to the letters of reference marked thereon.

The nature of my invention consists in the arrangement and combination of simple mechanical devices for the purpose of giving a rapid reciprocating motion to a saw, multiplied without the intervention of gearing or cranks, and by the application of a slight amount of power. This is accomplished by obtaining, under the arrangement shown, two motions of the saw to one vibration of the lever, and by utilizing the momentum of the weight acquired from the action of the spring, thus combining rapid motion with economy of power.

To enable others skilled in the art to make and use my invention, I will proceed to describe its construction and operation.

Figure 1 of the annexed drawings is a side elevation of the machine, and Fig. 2 is a sectional view of the lever differently applied.

In Fig. 1, letter A represents a lever moving on its axis at L, and operated by feet placed on the treadles J′ J″.

B is a weight in connection with the lever A.

C C are small rollers running on bearings.

D is a strap, one end of which is fastened to the lever A through the weight B and the other end attached to the hook E′.

G G are levers moving on centers fastened in the support H.

F is the saw, hooked in the hooks E′ and E″, and strained tight by the action of the spring I through the link K on the upper lever G.

In Fig. 2, A represents the lever; B, the weight connected with the same; D, a connecting-rod attached to the hook E, being a different arrangement from that shown in Fig. 1, but which may be used to accomplish the same object.

In the operating of the machine, as shown in Fig. 1, the spring I, through the connection by the link K to the lever G and saw F to hook E′, and by the strap D to the lever A, maintains the lever A in a perpendicular position until by the action of the foot on the treadle J′ it is thrown out of perpendicular from the center to the right, moving with it the strap D, which, striking the roller C, is made to draw down the hook E′, and causes the saw F to descend. Upon releasing the pressure of the foot upon the treadle J′, the spring I, by its action, as described, raises the saw F and the lever A again to a perpendicular position, when the momentum of the weight B, acquired from the action of the spring I, aided by a slight pressure of the foot upon the treadle J″, throws the lever A from the center to the left as far as desired, (giving any stroke to the saw from zero to the full stroke, at the pleasure of the operator,) moving the strap D, thus again causing the saw F to descend until the pressure of the foot upon the treadle J″ is released, the spring I causing the saw F to ascend, and drawing the lever A again to its perpendicular position. In Fig. 2 the same effect is produced by the connecting-rod D, which, when the lever A is thrown from the perpendicular position, draws down the hook E′, levers G′ G″, and saw F. The lever A and weight B may be used in the form of a wheel or its equivalent.

I have described my invention as operated by the human feet. When desired, however, it is intended to operate it by steam or other power.

Having thus fully described my invention, what I claim as new, and desire to secure by Letters Patent, is—

1. The vibrative weighted lever A, or its equivalent, constructed and operating substantially as and for the purposes specified.

2. The combination of the pulleys C C and strap D with the saw-hook E′ and vibrative weighted lever A, substantially as and for the purposes specified.

3. The connecting-rod D′, in combination with the saw-hook E′ and vibrative weighted lever A, operating substantially as and for the purposes set forth.

LYSANDER WRIGHT.

Witnesses:

JO C. CLAYTON,

V. C. CLAYTON.